(12) United States Patent
Onaka et al.

(10) Patent No.: US 8,049,955 B2
(45) Date of Patent: Nov. 1, 2011

(54) OPTICAL AMPLIFICATION APPARATUS, OPTICAL COMMUNICATION APPARATUS, AND OPTICAL COMMUNICATION METHOD

(75) Inventors: Miki Onaka, Kawasaki (JP); Yasushi Sugaya, Kawasaki (JP); Togo Fukushi, Kawasaki (JP); Masanori Kondoh, Kawasaki (JP); Kiyotoshi Noheji, Kawasaki (JP); Takashi Hayasaka, Minato (JP)

(73) Assignee: Fujitsu Limited, Kawasaki (JP)

( * ) Notice: Subject to any disclaimer, the term of this patent is extended or adjusted under 35 U.S.C. 154(b) by 411 days.

(21) Appl. No.: 12/285,229

(22) Filed: Sep. 30, 2008

(65) Prior Publication Data

US 2009/0195863 A1  Aug. 6, 2009

(30) Foreign Application Priority Data

Feb. 4, 2008  (JP) .................................. 2008-024231

(51) Int. Cl.
*H04B 10/17* (2006.01)
*H04B 10/12* (2006.01)
(52) U.S. Cl. .................................. 359/334; 359/341.41
(58) Field of Classification Search .................. 359/334, 359/341.41
See application file for complete search history.

(56) References Cited

U.S. PATENT DOCUMENTS

| | | | |
|---|---|---|---|
| 6,462,861 B2 * | 10/2002 | Ohshima et al. | 359/334 |
| 6,639,716 B1 | 10/2003 | Tomofuji | |
| 7,068,421 B2 | 6/2006 | Tokura et al. | |
| 2002/0041431 A1 * | 4/2002 | Ohshima et al. | 359/334 |
| 2005/0024712 A1 | 2/2005 | Hiraizumi et al. | |
| 2005/0099676 A1 | 5/2005 | Tokura et al. | |
| 2008/0123180 A1 | 5/2008 | Nakata | |
| 2009/0153951 A1 | 6/2009 | Hiraizumi et al. | |

FOREIGN PATENT DOCUMENTS

| | | |
|---|---|---|
| EP | 1130802 | 9/2001 |
| EP | 1427075 | 6/2004 |
| JP | H 8-139672 A | 5/1996 |
| JP | 2000-232433 A | 8/2000 |
| JP | 2004-193640 | 7/2004 |
| JP | 2004-193640 A | 7/2004 |
| JP | 2006-189465 | 7/2006 |
| JP | 2006-189465 A | 7/2006 |
| WO | 2006/137123 A1 | 1/2006 |

OTHER PUBLICATIONS

Extended European Search Report, mailed Jun. 12, 2009, in corresponding European Application No. 08165364.4 (9 pp.).
Japanese Office Action issued Dec. 2, 2009 in corresponding Japanese Patent Application 2008-024231.

* cited by examiner

*Primary Examiner* — Eric Bolda
(74) *Attorney, Agent, or Firm* — Staas & Halsey LLP

(57) ABSTRACT

A Raman amplifier inputs pump light into an optical fiber (transmission path) through which an optical signal passes, to amplify the optical signal. An optical receiving unit is provided downstream of the Raman amplifier and monitors the power of the optical signal amplified by the Raman amplifier. A calculating unit determines Raman amplification gain based on the power of the optical signal monitored by the optical receiving unit, and calculates the power of a noise component included in the optical signal based on the gain. The calculating unit, in real-time, calculates the power, which varies in complicated manners depending on conditions, and outputs information concerning to the power to another apparatus at a frequency on the order of milliseconds.

4 Claims, 13 Drawing Sheets

| | GAIN OF OPTICAL SIGNAL [dB] | POWER OF OPTICAL SIGNAL [dBm] |
|---|---|---|
| 1 | 8 | A |
| 2 | 9 | B |
| 3 | 10 | C |
| 4 | 11 | D |
| 5 | 12 | E |

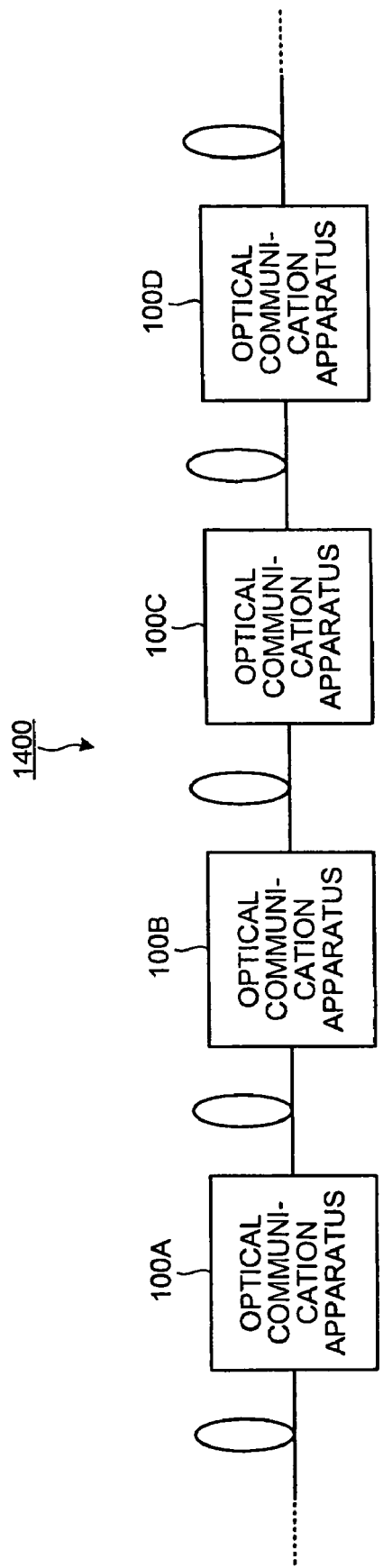

OPTICAL AMPLIFICATION APPARATUS, OPTICAL COMMUNICATION APPARATUS, AND OPTICAL COMMUNICATION METHOD

CROSS-REFERENCE TO RELATED APPLICATIONS

This application is based upon and claims the benefit of priority from the prior Japanese Patent Application No. 2008-024231, filed on Feb. 4, 2008, the entire contents of which are incorporated herein by reference.

BACKGROUND OF THE INVENTION

1. Field of the Invention

The present invention relates to an optical amplification apparatus for light amplification, an optical communication apparatus, and an optical communication method.

2. Description of the Related Art

With the increase in communication traffic in recent years, demand for optical communication apparatuses have increased. Besides optical repeaters introduced into main networks, recently optical communication apparatuses have been actively introduced into local networks, and optical networks have also been established in subscriber loop systems. Such optical communication systems play important roles in worldwide information networks.

In optical communication systems, optical amplification/repeater systems that include wavelength-multiplexed optical amplifiers (erbium doped fiber amplifiers (EDFA)) on each transmission path are used to realize long-distance transmission having greater capacities at a lower cost and with higher reliability. When repeater associated loss in optical amplification/repeater systems is large due to increased transmission path length, for example, the power of signal components included in an optical signal input into an optical amplifier decreases, resulting in deterioration of signal/noise (SN) ratios and potentially leading to degradation of transmission characteristics.

As a countermeasure technique, distributed Raman amplification (DRA) is used to input pump light into a transmission path so as to amplify, by utilizing the Raman effect, optical signals passing through the transmission path, thereby increasing the power of the signal components. As a result, SN ratios increase and transmission characteristics improve; hence, distributed Raman amplifiers have been in practical use as an effective technique.

In optical communication systems, the longer the distance between repeater points is, the greater optical loss in a transmission path becomes. Optical loss in a typical transmission path is on the order of 0.2 dB/km, and transmission path loss increases commensurately with the distance between repeater points. When various optical elements are arranged on a transmission path, further optical signal loss occurs as a result of the transmission loss associated with each of the optical elements. The greater the repeater associated loss, the smaller the power of the optical signal becomes.

In optical communication systems, optical amplification techniques (EDFA, Raman amplification, or the like) are typically used. The larger the gains by the optical amplification techniques, the more noise components (spontaneous emission light) there are. Thus, when optical amplification techniques having larger gains are employed in transmission paths exhibiting larger repeater losses, the ratio of signal component power relative to the power of noise components included in optical signals decreases. When optical signals are provided by wavelength-multiplexed light, smaller numbers of signal wavelengths lead to smaller ratios of signal component power relative to the power of noise components included in the optical signals.

Power controlling apparatuses, used in optical communication systems, not only simply amplify optical signals but further control the power of the optical signals to be constant. A power controlling apparatus typically uses a branching coupler and a photo diode (PD) to monitor a total power (signal component+noise component) of an optical signal and to control, per channel, the power of a signal component based on information received from a monitoring system or the like concerning the number of signal wavelengths.

The purpose of a power controlling apparatus is to control the power of signal components included in an optical signal. However, when power control is performed based on the total power of a monitored optical signal, if the power of the noise components is large relative to the power of signal components, the control deteriorates (see, for example, Japanese Patent Application Laid-Open Publication No. 2000-232433). Failure to control the power of the signal components at a normal level, may potentially lead to a problem such as deterioration of transmission characteristics.

For example, increased power of the signal components included in an optical signal leads to deterioration of the signal components due to non-linear characteristics of transmission paths, thereby increasing the possibility of reception errors occurring. On the contrary, decreased power of signal components included in an optical signal leads to the occurrence of deteriorated transmission waveforms due to the effect of SN ratios, thereby increasing the possibility of reception errors occurring. As such, Japanese Patent Application Laid-Open Publication No. 2006-189465 discloses a power controlling apparatus that is configured to estimate the power of a noise component included in an optical signal and to subtract the estimated power from a total power of the optical signal to thereby calculate the power of a signal component included in the optical signal.

However, since power of the noise components occurring in the optical signal varies in a complicated manner depending on conditions of transmission paths, a problem arises in that accurate calculation of the power of the noise components is difficult. For example, gain characteristics in Raman amplification vary depending on fluctuation of design parameters or optical characteristics of transmission paths. Variations of gain characteristics in Raman amplification further lead to variation in the power of the noise components caused by Raman amplification.

For example, optical characteristics of transmission paths vary depending on: contamination at a connecting portion of an optical connector that connects optical fibers with each other; optical loss such as that due to bending loss of an optical fiber; manufacturing tolerance (e.g., loss coefficient and effective cross-sectional area) affecting characteristics of the transmission path fiber itself; variations in loss due to fusion bonded portions in transmission path fibers; aged deterioration; and ambient air temperature.

The technique according to Japanese Patent Application Laid-Open Publication No. 2006-189465 is configured to monitor a power of pump light at a Raman amplifier, to calculate Raman gain based on the monitored result, and to calculate the power of noise components from the calculated gain. However, as pumping efficiencies of Raman amplification vary depending on the type of transmission path, in practice, accurate estimation of the pump light power to be input into a transmission path is difficult. Further, when loss at the output side of a transmission paths increases as a result of, for example, application of a certain load to a fiber or connector, even when there is no variation in the monitored pump light, the power of pump light actually input to the transmission paths decreases, thereby resulting in decreased gain and optical noise.

In these situations (such as variations in transmission path loss, pump light power monitoring errors, temperature characteristics, and aged deterioration), inherently proportional relationships between pump light power and gain are not constant, thereby making accurate estimation of optical noise power difficult. Thus, characteristics of noise component power with respect to pump light power are not constant. As a result, with the technique disclosed in Japanese Patent Application Laid-Open Publication No. 2006-189465, a problem arises in that the power of noise components cannot be calculated with high accuracy.

It is conceivable to exclude, from being subject to system support, optical signals having fewer channels where the ratio of the power of noise components relative to the power of the signal components becomes larger. Although this enables a decrease of the ratio of the power of the noise components relative to the power of the signal components, optical signals subject to system support are limited, thereby significantly reducing convenience.

It is further conceivable to prepare a database of the noise component power that occurs according to system conditions, respectively. However, the noise component power occurring in Raman amplification varies according to system conditions (gains of Raman amplification, repeater loss, transmission path type, loss coefficients of transmission path fibers, effective cross-sectional areas of transmission paths, transmission path lengths, and the like).

As a result, a problem arises in that an extensive database must be maintained to realize power control with greater accuracy. Further, maintenance of such an extensive database causes another problem in that the process of selecting appropriate values from the database takes time, making retrieval of the power of the noise components in real-time difficult.

SUMMARY OF THE INVENTION

It is an object of the present invention to at least solve the above problems in the conventional technologies.

An optical amplification apparatus according to one aspect of the present invention includes a Raman amplifier that inputs pump light into an optical fiber through which an optical signal passes, to amplify the optical signal; a first optical receiving unit provided downstream of the Raman amplifier and configured to monitor power of the optical signal amplified by the Raman amplifier; a gain calculating unit that, based on the power monitored by the first optical receiving unit, calculates gain of the optical signal imparted by the pump light; a noise-power calculating unit that, based on the gain calculated by the gain calculating unit, calculates power of a noise component included in the optical signal; and an output unit that outputs the power calculated by the noise-power calculating unit.

An optical communication apparatus according to another aspect of the present invention includes the optical amplification apparatus; and a power controlling apparatus that is provided downstream of the optical amplification apparatus and receives the optical signal amplified by optical amplification apparatus. The power controlling apparatus, to calculate power of a signal component included in the optical signal amplified, subtracts the power of the noise component from the power of the optical signal received, and based on the power calculated for the signal component, controls the power of the optical signal amplified, to improve accuracy of gain control or output control.

An optical communication method according to still another aspect of the present invention includes Raman amplifying an optical signal by inputting pump light of a Raman amplifier into an optical fiber through which the optical signal passes; monitoring power of the optical signal amplified at the Raman amplifying, by an optical receiving unit provided downstream of the Raman amplifier; calculating, based on the power monitored at the monitoring, gain of the optical signal imparted by the pump light; calculating, based on the gain calculated at the calculating gain, power of a noise component included in the optical signal; outputting information concerning the power calculated at the calculating the power of a noise component; and controlling the power of the optical signal amplified based on power of a signal component included in the optical signal amplified. The controlling the power of the optical signal amplified includes calculating the power of the signal component, based on the power of the optical signal amplified and the power indicated by the information output at the outputting.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 14 is a block diagram of an optical communication system according to an embodiment.

DETAILED DESCRIPTION OF THE PREFERRED EMBODIMENTS

Referring to the accompanying drawings, exemplary embodiments according to the present invention are explained in detail below.

Figure 1:
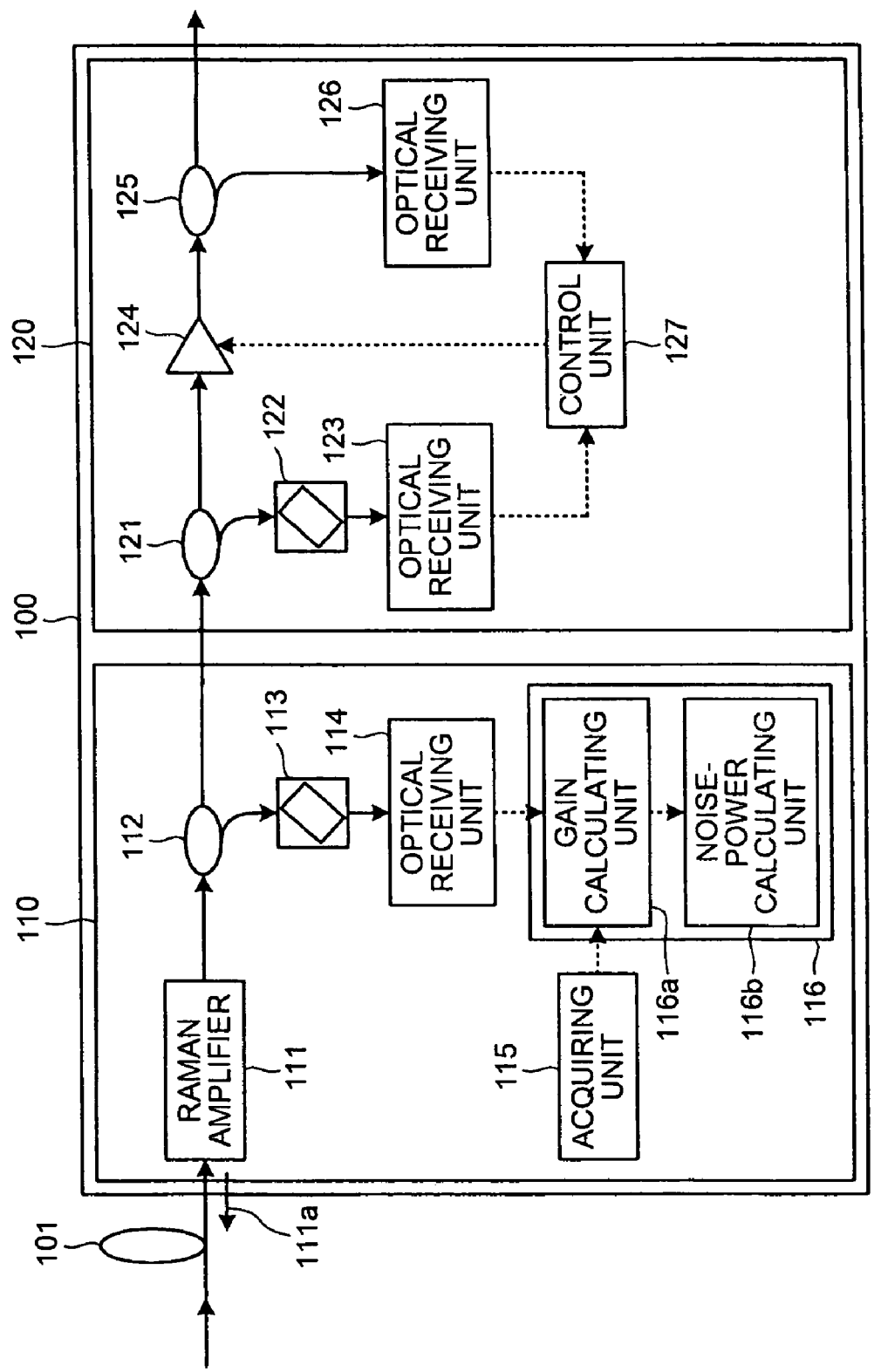
FIG. 1 is a block diagram of a functional configuration of an optical communication apparatus according to an embodiment.

FIG. 1 is a block diagram of a functional configuration of an optical communication apparatus according to an embodiment. In FIG. 1, solid line arrows denote optical paths, and dotted line arrows denote electrical paths (further applicable for FIG. 2). As depicted in FIG. 1, an optical communication apparatus 100 according to the embodiment includes an optical amplification apparatus 110 and a power controlling apparatus 120. The optical communication apparatus 100 may be adopted in a repeater in an optical communication system, for example. The optical amplification apparatus 110 includes a Raman amplifier 111, a branching unit 112, a filter 113, an optical receiving unit 114, an acquiring unit 115, and a calculating unit 116.

The Raman amplifier 111 receives input of an optical signal through a transmission path 101 (optical fiber) upstream from the optical amplification apparatus 110. The optical signal may be, for example, wavelength-multiplexed light. The Raman amplifier 111 outputs the optical signal received through the transmission path 101 to the branching unit 112. Further, the Raman amplifier 111 inputs pump light (reference numeral 111a) into the transmission path 101, in a direction opposite to the passing direction of the optical signal.

As a result the optical signal passing through the transmission path 101 is Raman amplified commensurately with the pump light input into the transmission path 101. The branching unit 112 branches the optical signal output from the Raman amplifier 111, and respectively outputs the branched optical signal into the filter 113 and the power controlling apparatus 120. The branching unit 112 may be an optical coupler, for example.

The filter 113 (second optical filter) transmits the optical signal from the branching unit 112 and outputs the optical signal to the optical receiving unit 114. The filter 113 has a wavelength transmission characteristic equivalent to that of an optical filter provided in a path through which the optical signal output to the power controlling apparatus 120 passes to an optical receiving unit 123 (second optical receiving unit) of the power controlling apparatus 120. Herein, the filter 113 has the wavelength transmission characteristic equivalent to that of a filter 122, which is provided in a path that the optical signal passes to the optical receiving unit 123 of the power controlling apparatus 120.

The optical receiving unit 114 functions as an optical receiving unit that monitors the optical signal amplified by the Raman amplifier 111. Specifically, the optical receiving unit 114 converts the optical signal output from the branching unit 112 and transmitted through the filter 113, into an electrical signal according to the power of the optical signal. The optical receiving unit 114 outputs the electrical signal to the calculating unit 116. The optical receiving unit 114 may be a photodiode, for example.

The acquiring unit 115 may be regarded as a window of the optical amplification apparatus 110 through which system information (the number of signal wavelengths, input power into the transmission path 101, and the like) from a supervisory signal (optical supervisory channel (OSC)) or the like is received. The acquiring unit 115 acquires information concerning an input power input from an optical communication apparatus upstream from the optical communication apparatus 100 into the transmission path 101, where the information is utilized for control of an optical power level such as constant-gain control of the optical amplification apparatus 110. The acquiring unit 115 outputs the acquired information concerning the input power to the calculating unit 116.

Based on the electrical signal output from the optical receiving unit 114, the calculating unit 116 calculates the power of noise components in the optical signal amplified by the Raman amplifier 111. The calculating unit 116 acquires the electrical signal output from the optical receiving unit 114 in real-time to periodically calculate the power of the noise components in the optical signal. The calculating unit 116 outputs the calculated power of the noise components to the power controlling apparatus 120. Specifically, the calculating unit 116 includes a gain calculating unit 116a and a noise-power calculating unit 116b.

The gain calculating unit 116a, to calculate gain of the optical signal by Raman amplification performed by the Raman amplifier 111, uses at least the power of the optical signal indicated by the electrical signal output from the optical receiving unit 114 and the information concerning the input power output from the acquiring unit 115. Although the method for calculating gain of Raman amplification is not defined in the present embodiment, the method disclosed in Japanese Patent Application Laid-Open Publication No. 2004-193640, for example, may be desirable. The calculating unit 116 outputs information concerning the calculated gain of the optical signal to the noise-power calculating unit 116b.

Based on the gain of the optical signal indicated by the information output from the gain calculating unit 116a, the noise-power calculating unit 116b calculates the power of the noise components in the optical signal amplified by the Raman amplifier 111. The noise-power calculating unit 116b outputs information concerning the calculated power of the noise components to the power controlling apparatus 120.

The power controlling apparatus 120 includes a branching unit 121, the filter 122, the optical receiving unit 123, an amplifying unit 124, a branching unit 125, an optical receiving unit 126, and a control unit 127. The branching unit 121 branches the optical signal output from the optical amplification apparatus 110 and outputs the branched optical signal to the filter 122 and the amplifying unit 124, respectively.

The filter 122 extracts only optical signal components within a signal band from the optical signal output from the branching unit 121 and outputs the optical signal components to the optical receiving unit 123. The optical receiving unit 123 is a second optical receiving unit that monitors the power of the optical signal amplified by the optical amplification apparatus 110. The optical receiving unit 123 converts the optical signal output from the filter 122 into an electrical signal according to the power of the optical signal. The optical receiving unit 123 outputs the electrical signal to the control unit 127.

The amplifying unit 124 amplifies the optical signal output from the branching unit 121 under the control of the control unit 127, and outputs the optical signal to the branching unit 125. The amplifying unit 124 may be an erbium doped fiber amplifier, for example. The branching unit 125 branches the optical signal output from the amplifying unit 124 to a main optical signal path and a branched optical path, where the optical signal is monitored by the optical receiving unit 126.

The optical receiving unit 126 converts the optical signal output from the branching unit 125 into an electrical signal according to the power of the optical signal. The optical receiving unit 126 outputs the electrical signal to the control unit 127. The control unit 127, utilizing the power of the noise components indicated by the information received from the optical amplification apparatus 110, calculates the power of the signal components in the optical signal amplified by the optical amplification apparatus 110.

For example, the control unit 127, to calculate power of signal components in the optical signal before input into the amplifying unit 124, is capable of subtracting the power of the noise components indicated by the information output from the optical amplification apparatus 110 from the power of the optical signal indicated by the electrical signal output from the optical receiving unit 123. Thus, the control unit 127 is enabled to accurately control the optical level of signal light, based on the information concerning the signal components.

The control unit 127, to calculate the power of the signal components in the optical signal amplified by the amplifying unit 124, may subtract the power of the noise components indicated by the information output from the optical amplification apparatus 110 from the power of optical signal indicated by the electrical signal output from the optical receiving unit 126. In this situation, the control unit 127 controls the amplifying unit 124 so that the calculated power of the signal component is kept constant. As described above, the present embodiment refers to a configuration that accurately calculates optical noise power in distributed Raman amplification and provides the calculation result to a downstream controlling medium (e.g., erbium doped fiber amplifier). Further, according to present invention, the way information provided to the downstream controlling medium is utilized (controlling method) at the controlling medium is not limited in any way.

The control unit 127 may calculate the gain of the amplifying unit 124 for the signal component in the optical signal, based on the power of the optical signal indicated by the electrical signal output from the optical receiving unit 123, the power of the optical signal indicated by the electrical signal output from the optical receiving unit 126, and calculate the power of the noise components indicated by the information output from the optical amplification apparatus 110. In this situation, the control unit 127 controls the amplifying unit 124 so that the calculated gain of the signal component is kept constant.

Figure 2:
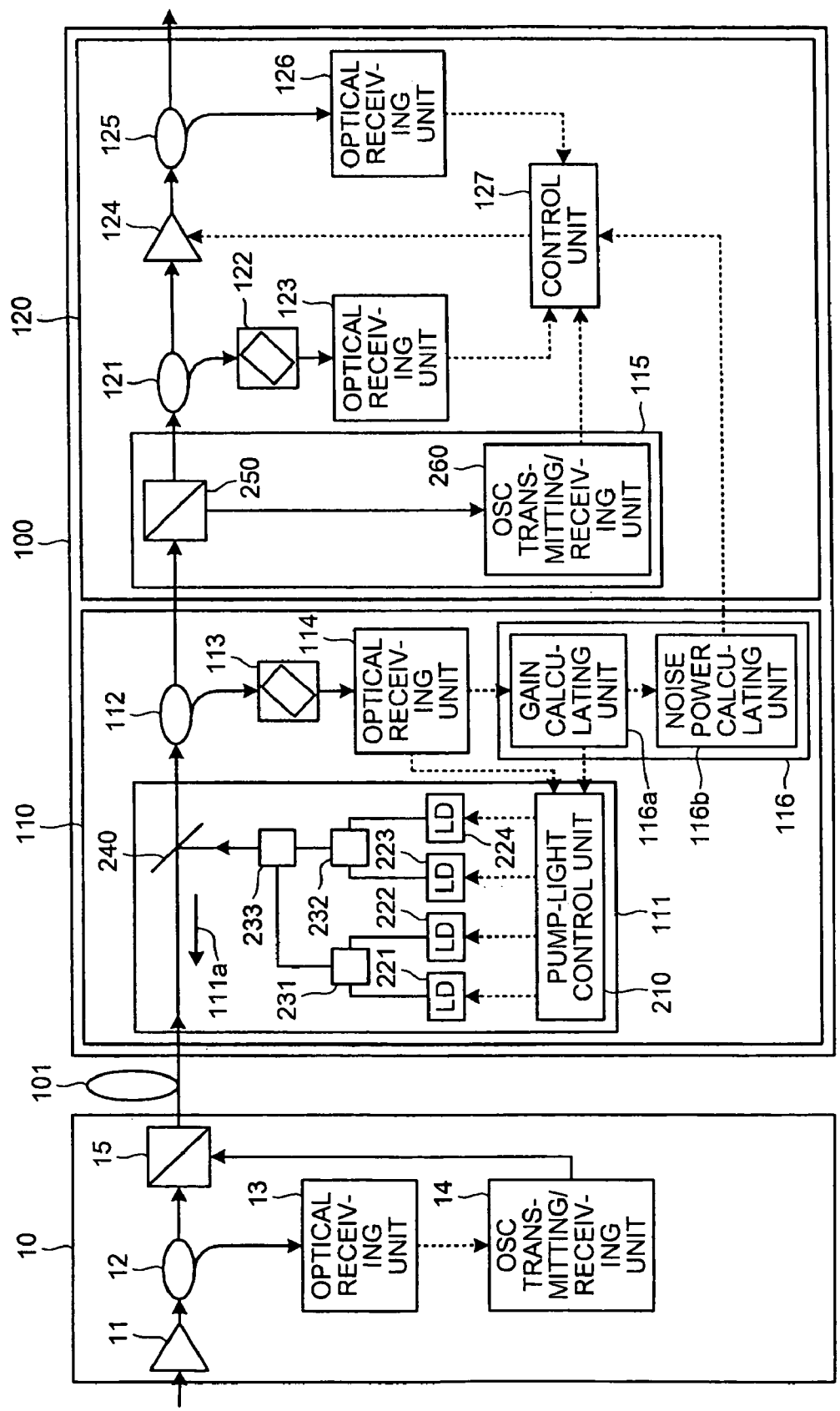
FIG. 2 is a block diagram of an example of the optical communication apparatus depicted in FIG. 1.

FIG. 2 is a block diagram of an example of the optical communication apparatus depicted in FIG. 1. In FIG. 2, elements identical to those depicted in FIG. 1 are designated by identical reference numerals, respectively and description thereof is omitted. An optical communication apparatus 10 functioning as a communication node is upstream from connected to the optical communication apparatus 100 through the transmission path 101. The optical communication apparatus 10 includes an amplifying unit 11, a branching unit 12, an optical receiving unit 13, an OSC transmitting/receiving unit 14, and a multiplexer 15.

An optical signal input into the optical communication apparatus 10 is amplified by the amplifying unit 11 and branched by the branching unit 12. The branched optical signal is respectively output to the optical receiving unit 13 and the multiplexer 15. The optical receiving unit 13 converts the branched optical signal into an electrical signal according to the power of the optical signal and outputs the electrical signal to the OSC transmitting/receiving unit 14.

The OSC transmitting/receiving unit 14 outputs, as an OSC signal to the multiplexer 15, information concerning the power of the optical signal indicated by the electrical signal output from the optical receiving unit 13. The OSC signal is a signal that utilizes a dedicated monitoring channel having a wavelength different from that of signal components in the optical signal. The multiplexer 15 multiplexes the optical signal output from the branching unit 12 with the OSC signal output from the OSC transmitting/receiving unit 14. The multiplexer 15 transmits the multiplexed signal to the optical communication apparatus 100 through the transmission path 101. Configuration may be such that the multiplexer 15 is arranged at an input side of the branching unit 12 without limitation herein.

The Raman amplifier 111 of the optical communication apparatus 100 includes a pump-light control unit 210, laser diodes (LDs) 221 to 224, couplers 231 to 233, and a multiplexing unit 240. The optical receiving unit 114 outputs the obtained electrical signal to the calculating unit 116 and the Raman amplifier 111. The pump-light control unit 210 controls the power of pump light to be output from the LDs 221 to 224 so that the power of the optical signal indicated by the electrical signal output from the optical receiving unit 114 becomes a predetermined value obtained by the various calculations, so as to keep the Raman amplification gain at a targeted constant value (constant-gain control), for example.

The LDs 221 to 224 output light of respectively different wavelengths as pump light. The pump-light control unit 210 controls the power of the pump light output respectively by each of the LDs 221 to 224 so that gain for the optical signal passing through the transmission path 101 can be varied. Pump light respectively output from the LDs 221 to 224 is coupled by the couplers 231 to 233 and output to the multiplexing unit 240. Although the number of pumping LDs is four according to the embodiment, configuration according to the present invention is without limitation herein including details of the pump light multiplexing unit, and the like.

The multiplexing unit 240 outputs the optical signal input through the transmission path 101, to the branching unit 112. The multiplexing unit 240 inputs the pump light coupled by the couplers 231 to 233, into the transmission path 101, thereby causing the optical signal passing through the transmission path 101 to be Raman amplified according to the pump light input thereto from the multiplexing unit 240.

Although the pump-light control unit 210 has been explained for a situation where a pump-light control unit controls the power of pump light so that the power of the optical signal indicated by the electrical signal output from the optical receiving unit 114 is made constant, information indicative of the gain calculated by the gain calculating unit 116a can be output to the pump-light control unit 210. In this situation, the pump-light control unit 210 may control the power of the pump light so that the gain indicated by the information output from the gain calculating unit 116a is made constant (constant-gain control).

The acquiring unit 115 depicted in FIG. 1 is provided on the power controlling apparatus 120 side, here. The acquiring unit 115 includes a demultiplexer 250 and an OSC transmitting/receiving unit 260. The demultiplexer 250 is provided upstream from the branching unit 121. The demultiplexer 250 transmits optical signal output from the optical amplification apparatus 110 to the branching unit 121, separates the OSC signal included in the optical signal output from the optical amplification apparatus 110, and outputs the OSC signal to the OSC transmitting/receiving unit 260.

The OSC transmitting/receiving unit 260 receives the OSC signal output from the demultiplexer 250. Included in the OSC signal received by the OSC transmitting/receiving unit 260 is information concerning: a transmission path such as the transmission path 101, the number of multiplexed wavelengths of optical signal; and the information concerning the power of optical signal in the optical communication apparatus 10 (output from the OSC transmitting/receiving unit 14 of the optical communication apparatus 10); and the like.

The OSC transmitting/receiving unit 260, as information concerning the power of the optical signal upon input into the transmission path 101, acquires the information included in the OSC signal concerning the power of the optical signal in the optical communication apparatus 10. The OSC transmitting/receiving unit 260 outputs the obtained information concerning the input power, to the gain calculating unit 116a of the optical amplification apparatus 110. The OSC transmitting/receiving unit 260 further outputs the information concerning the number of multiplexed wavelengths of the optical signal, and the like included in the OSC signal, to the control unit 127.

The control unit 127 may divide the calculated power of signal components by the number of multiplexed wavelengths of the optical signal indicated by the information output from the OSC transmitting/receiving unit 260, thereby calculating, per channel, the power of the signal components in the optical signal. In this situation, the control unit 127 controls the amplifying unit 124, based on the signal component power calculated per channel.

Here, the demultiplexer 250 and the filter 122 are provided in the path through which the optical signal passes before being input into the optical receiving unit 123 of the power controlling apparatus 120. Thus, the filter 113 has a wavelength transmission characteristic equivalent to a combined wavelength transmission characteristic of the demultiplexer 250 and the filter 122. When the filter 122 is not provided, the filter 113 has a wavelength transmission characteristic equivalent to that of the demultiplexer 250.

Figures 3, 4:
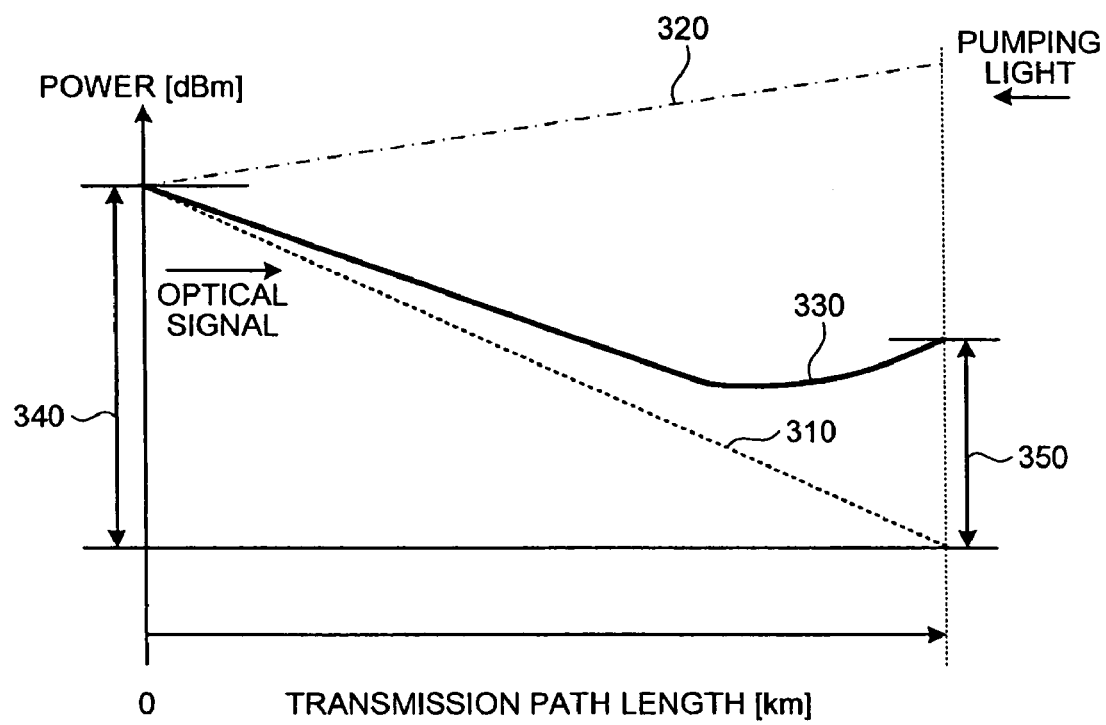
FIG. 3 is a graph of Raman amplification in a transmission path of an optical signal.
FIG. 4 is a table correlating gain of the optical signal and power of the optical signal.

FIG. 3 is a graph of Raman amplification in the transmission path of the optical signal. In FIG. 3, the abscissa represents the length of the transmission path 101. The right side of the abscissa corresponds to the optical communication apparatus 100, and the left side of the abscissa corresponds to the optical communication apparatus 10 upstream from the optical communication apparatus 100. The ordinate represents an image of a relative value of power of respective light in the transmission path 101.

A dotted line 310 indicates power variation of the optical signal when no pump light from the Raman amplifier 111 is input into the transmission path 101. As indicated by the dotted line 310, the optical signal is not Raman amplified when no pump light is input into the transmission path 101 and hence, the power of the optical signal decreases as the optical signal travels along the transmission path 101. The optical signal exhibits a span loss represented by a difference 340 between the power of the optical signal upon input into the transmission path 101 and the power of the optical signal upon input into the optical communication apparatus 100 after passing through the transmission path 101.

A broken line 320 indicates power variation of pump light input into the transmission path 101 from the Raman amplifier 111. As indicated by the broken line 320, the pump light input into the transmission path 101 has a maximum power upon input from the Raman amplifier 111 and the power decreases as the optical signal travels in a reverse direction with respect to the optical signal along the transmission path 101. Thus, the optical signal passing through the transmission path 101 is Raman amplified as the optical signal crosses with the pump light, where the power of the pump light is greater the closer to the optical communication apparatus 100.

A solid line 330 represents power variation of the optical signal in a situation where pump light from the Raman amplifier 111 is input into the transmission path 101. As indicated by the solid line 330, gain of the optical signal passing through the transmission path 101 increases by Raman amplification as the optical signal approaches the optical communication apparatus 100.

The gain of the optical signal by Raman amplification is represented by a difference 350 between the power of the optical signal in a situation where no pump light is input into the transmission path 101 from the Raman amplifier 111 and the power of the optical signal in a situation where pump light is input in to the transmission path 101 from the Raman amplifier 111.

FIG. 4 is a table correlating gain of the optical signal and power of the optical signal. The gain calculating unit 116a depicted in FIG. 2 generates table 400 as depicted in FIG. 4, for example. Table 400 correlates gain [decibel (dB)] of main signal light amplified by the Raman amplifier 111 and power [dBm] (noise light power+main signal light power, monitored at the optical receiving unit 114) of the optical signal amplified by the Raman amplifier 111. The gain calculating unit 116a calculates a relationship between the gain and the power of an optical signal. For example, a power P of the optical signal for the gain can be calculated by the following equation (1):

$$P = \text{power of noise component} + \text{power of signal component} = a \times Gx + 10x((Pin - Ploss + Gx)/10) \quad (1)$$

Figure 5:
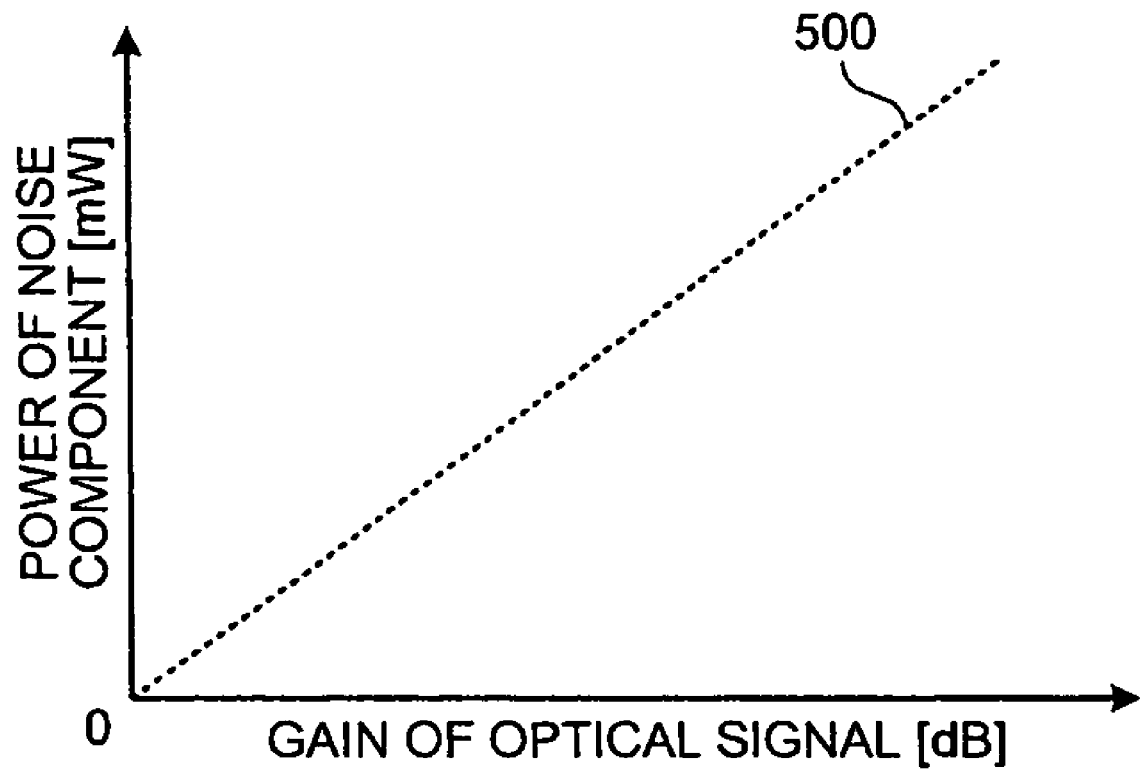
FIG. 5 depicts a relationship between the gain by Raman amplification and noise-light component power.

Namely, the current value of the noise light power+main signal light power monitored at the optical receiving unit 114 is compared with the powers P calculated from equation (1) respectively corresponding to values of gain to obtain the gain of signal light corresponding to the current optical signal power P. Once the current gain is known, a noise light power corresponding to the gain can be obtained by calculation. This is a means claimed by the present invention. To realize the calculations with greater accuracy, it is important to measure noise light powers in advance and determine a relationship between gain and noise light power (FIG. 5). This will be explained hereinafter.

In equation (1), Gx is gain (see the difference 350 in FIG. 3) of the optical signal by Raman amplification. "a" is a proportional coefficient between the gain Gx of the optical signal and noise component power. FIG. 5 depicts a relationship between the gain by Raman amplification and noise-light component power. To obtain information concerning the proportional coefficient a, pump light from the Raman amplifying apparatus is turned ON upon startup of the system before input of the main signal light (in a state where various signal light such as main signal light and supervisory signal light (OSC) are not input), to measure noise light power using the optical receiving unit 114 in a state where noise light due to Raman amplification is caused. At this time, since no optical signals are input into the optical amplification apparatus 110, the electrical signal output from the optical receiving unit 114 is indicative of the noise component power commensurating with the gain by Raman amplification.

Next, so-called signal light (which may be noise light equivalent to signal light) is input into the system as a subject, and the previously measured noise light power is utilized to obtain signal light component power by subtracting the noise light power from a light receiving result at the optical receiving unit 114. The thus obtained power and an optical level output from the transmission path (for example, an optical level of gain reference light according to Japanese Patent Application Laid-Open Publication No. 2004-193640) under a condition that Raman amplification is not conducted, and an input level (result of the optical receiving unit 13) of signal light into the transmission path, etc. can be used to obtain the gain by Raman amplification at that time, by calculation.

In this way, once the gain upon measurement of the noise light power is determined, the proportional coefficient a of gain can be obtained. Once the proportional coefficient a is determined, the calculating unit 116 may obtain the power of the optical signal and the noise component power at that time at the optical receiving unit 114, for each gain Gx of optical signal. Further, the calculating unit 116 acquires the electrical signal output from the optical receiving unit 114 and calculates the gain and by taking into account the calculation result, the pump-light control unit 210 adjusts the power of pump light to achieve a predetermined gain or optical signal power.

For exemplary details of a calculating method of such a proportional coefficient a, Japanese Patent Application Laid-Open Publication No. 2005-99916 may be referred to, for example. Assuming that Pin is the input power of the optical signal upon input into the transmission path 101, and Ploss is the span loss of the optical signal through the transmission path 101 (see difference 340 in FIG. 3), the Ploss can be calculated from equation (2).

$$Ploss = Pin - 10 \times \log(Pout - a \times Gx) + Gx \qquad (2)$$

In equation (2), Pout is a power of the optical signal indicated by the electrical signal output from the optical receiving unit 114. The gain calculating unit 116a is capable of calculating the gain Gx of the optical signal, based on equation (1) and equation (2). The calculating method of the gain Gx is not limited to the method (database method) explained herein, and other known methods may be adopted.

For example, approximation algorithms may be utilized to calculate the gain Gx of an optical signal. An approximation algorithm is a polynomial time algorithm for obtaining an approximate solution of an optimization problem. An approximate solution is a feasible solution (a solution that meets the restrictions of the problem), but is not necessarily an optimum solution. Among approximation algorithms, those algorithms particularly called "accuracy guaranteed approximation algorithms" for which it is guaranteed that a ratio between an objective function value of a solution output from the applicable algorithm and an objective function value of an optimum solution falls within a certain range.

Examples of calculating methods utilizing such approximation algorithms include one called "bisection method" or "binary-search method". The bisection method is a calculating method based on an intermediate-value theorem. The bisection method is a type of iterative method for solving an equation by iterating an operation to obtain an intermediate point of a section including the solution.

Whether a database method or an approximation algorithm is used to calculate the gain Gx of the optical signal, it is desirable to calculate the gain Gx of the optical signal after defining an assumed range of the gain Gx. For example, calculation of Gx can be achieved at higher speed by calculating Gx within an assumed design range such as Gx=5 to 10 dB.

FIG. 5 is a graph representing a relationship between optical signal gain and noise component power. In FIG. 5, the abscissa represents gain [dB] of an optical signal amplified by the Raman amplifier 111. The ordinate represents noise component power [milliwatt (mW)] of the optical signal due to Raman amplification. A dotted line 500 indicative of the characteristic of noise component power relative to gain of the optical signal. As indicated by the power characteristic 500, the power of noise component has a proportional relationship with the gain of optical signal.

The noise-power calculating unit 116b acquires, in advance, information concerning the proportional coefficient a between optical signal gain and noise component power, and calculates the noise component power in an optical signal amplified by the Raman amplifier 111, based on gain of the optical signal indicated by information output from the gain calculating unit 116a and the proportional coefficient a between the optical signal gain and the noise component power.

Figure 6:
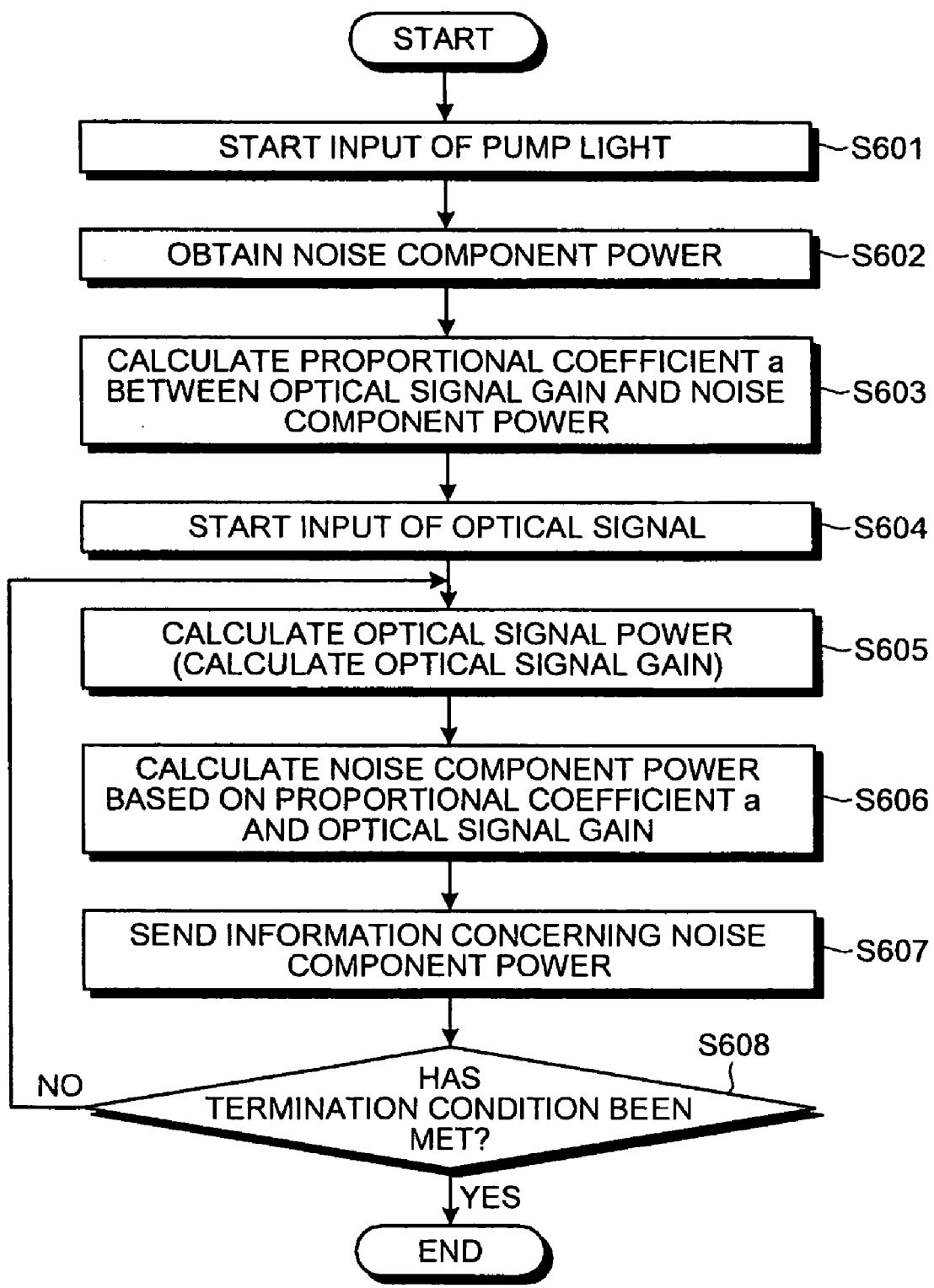
FIG. 6 is a flowchart of an example of operation of the optical amplification apparatus.

FIG. 6 is a flowchart of an example of operation of the optical amplification apparatus. As depicted in FIG. 6, the Raman amplifier 111 starts input of pump light into the transmission path 101 (step S601). At this time, input of optical signal into the optical amplification apparatus 110 is not started yet. The noise-power calculating unit 116b obtains noise component power based on an electrical signal output from the optical receiving unit 114 (step S602).

Signal light, or light corresponding to signal light, is input, and the noise component power acquired at step S602 is subtracted from a monitored value (light corresponding to signal light+noise light) of the optical receiving unit 114, in a manner to obtain optical signal gain based on an input level (result of the optical receiving unit 13) of the signal light input into the transmission path and on the value of the signal light component at the optical receiving unit 114, to thereby calculate the proportional coefficient a of noise component power (step S603). Execution of this operation enables establishment of table 400 (FIG. 4).

Input of an optical signal is started through the transmission path 101 (step S604), and this is regarded as a system operating state. The gain calculating unit 116a calculates optical signal gain (step S605), based on the optical signal power indicated by an electrical signal output from the optical receiving unit 114 and table 400 (see FIG. 4) that is prepared in a real-time manner periodically according to the time of collecting information for calculations and the time of performing the calculations.

The noise-power calculating unit 116b calculates the noise component power of the optical signal (step S606), based on the proportional coefficient a calculated at step S603 and the gain of the optical signal calculated at step S605. The noise-power calculating unit 116b informs the power controlling apparatus 120 of the noise component power of the optical signal calculated at step S606 (step S607).

It is judged whether a termination condition of the optical amplification apparatus 110 is met (step S608), and when the termination condition is not met (step S608: NO), the flow returns to step S605 and continues. When the termination condition is met (step S608: YES), a series of the operation is terminated.

The loop from step S605 to step S608 is performed in a real-time manner during system operation so that a calculation of noise light power is conducted in a real-time manner periodically according to the time of collecting information for calculations and the time of performing the calculations, thereby facilitating such a feature that information concerning noise light power that varies depending on the conditions is send to another apparatus in a real-time manner at a high frequency on the order of milliseconds.

Figure 7:
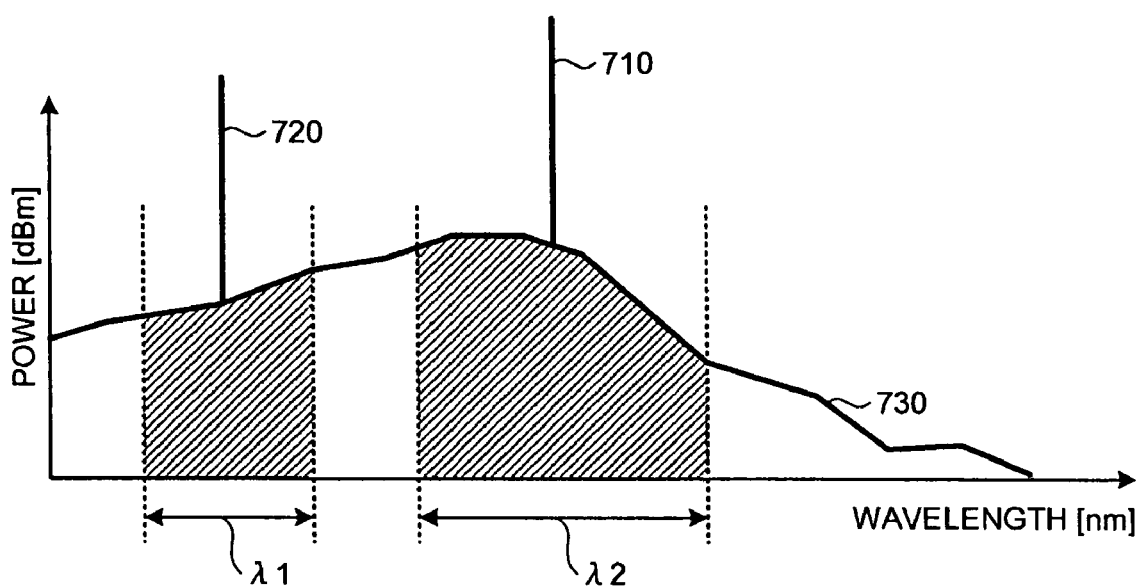
FIG. 7 is a graph of components of the optical signal.

FIG. 7 is a graph of components of the optical signal. In FIG. 7, the abscissa represents wavelengths [nanometer (nm)] of the optical signal input into the optical amplification apparatus 110. The ordinate represents the power [dBm] of wavelength components of the optical signal. Reference numeral 710 represents a signal component included in the optical signal. Reference numeral 720 represents an OSC signal included in the optical signal. Reference numeral 730 represents a noise component included in the optical signal. Signal band λ2 is a wavelength band for the signal component included in the optical signal. Supervisory signal band λ1 is a wavelength band for the OSC signal included in the optical signal.

Figure 8:
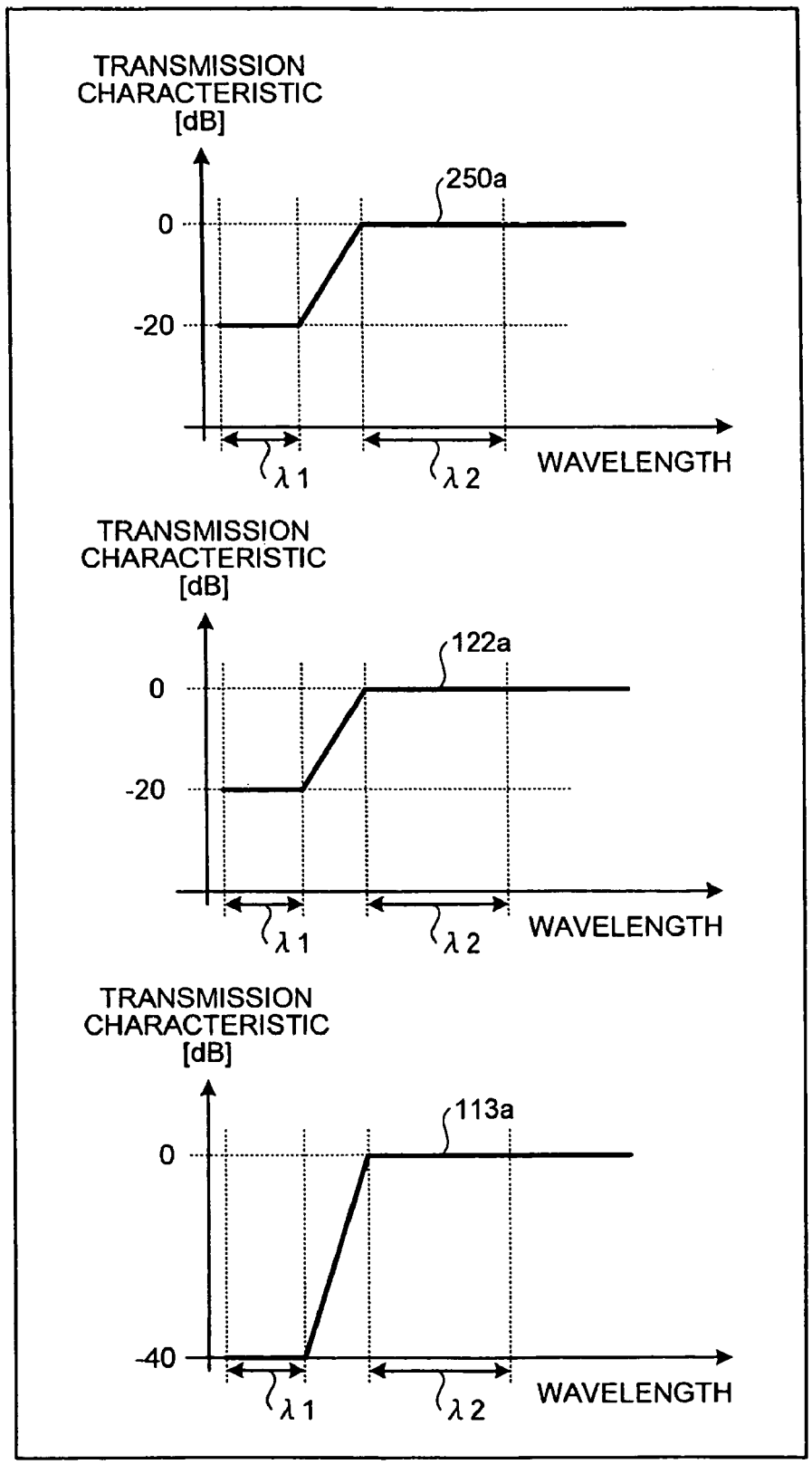
FIG. 8 depicts graphic examples of wavelength transmission characteristics of respective filters.

FIG. 8 depicts graphic examples of wavelength transmission characteristics of the filters, respectively. As depicted in FIG. 8, reference numeral 250a represents a wavelength transmission characteristic of the demultiplexer 250 provided in the power controlling apparatus 120, with respect an optical signal output to the branching unit 121. Reference numeral 122a represents a wavelength transmission characteristic of the filter 122 provided in the power controlling apparatus 120. Reference numeral 113a represents a wavelength transmission characteristic of the filter 113 provided in the optical amplification apparatus 110. For each wavelength transmission characteristic, the abscissa represents wavelength, and the ordinate represents transmission characteristic [dB].

The demultiplexer 250 separates the OSC signal from the optical signal to be output to the branching unit 121, and outputs the OSC signal to the OSC transmitting/receiving unit 260. Here, as indicated by the wavelength transmission characteristic 250a, the demultiplexer 250 acts as a high-pass filter configured to transmit therethrough wavelength components in and above the signal band $\lambda 2$ and to attenuate wavelength components in and below the supervisory signal band $\lambda 1$, for light input into the branching unit 121. The demultiplexer 250 exhibits a transmission characteristic of 0 dB for wavelength components in and above the signal band $\lambda 2$, and a transmission characteristic of −20 dB for wavelength components in and below the supervisory signal band $\lambda 1$.

The filter 122 extracts from optical signal passing therethrough, wavelength components that are in the signal band $\lambda 2$ and outputs the wavelength components to the optical receiving unit 123. Here, as indicated by the wavelength transmission characteristic 122a, the filter 122 may be a high-pass filter configured to transmit therethrough wavelength components of the passing optical signal in and above the signal band $\lambda 2$ and to attenuate wavelength components of the passing optical signal in and below the supervisory signal band $\lambda 1$, for light output to the branching unit 121. The filter 122 exhibits a transmission characteristic of 0 dB for wavelength components in and above the signal band $\lambda 2$, and a transmission characteristic of −20 dB for wavelength components in and below the supervisory signal band $\lambda 1$.

As indicated by the wavelength transmission characteristic 113a, the filter 113 has a wavelength transmission characteristic that is a combination of the wavelength transmission characteristic 250a of the demultiplexer 250 and the wavelength transmission characteristic 122a of the filter 122. Here, the filter 113 is configured as a high-pass filter that transmits therethrough wavelength components of the passing optical signal in and above the signal band $\lambda 2$ and attenuates wavelength components of the passing optical signal in and below the supervisory signal band $\lambda 1$. The filter 113 exhibits a transmission characteristic of 0 dB for wavelength components in and above the signal band $\lambda 2$, and a transmission characteristic of −40 dB for wavelength components in and below the supervisory signal band $\lambda 1$.

Figure 9:
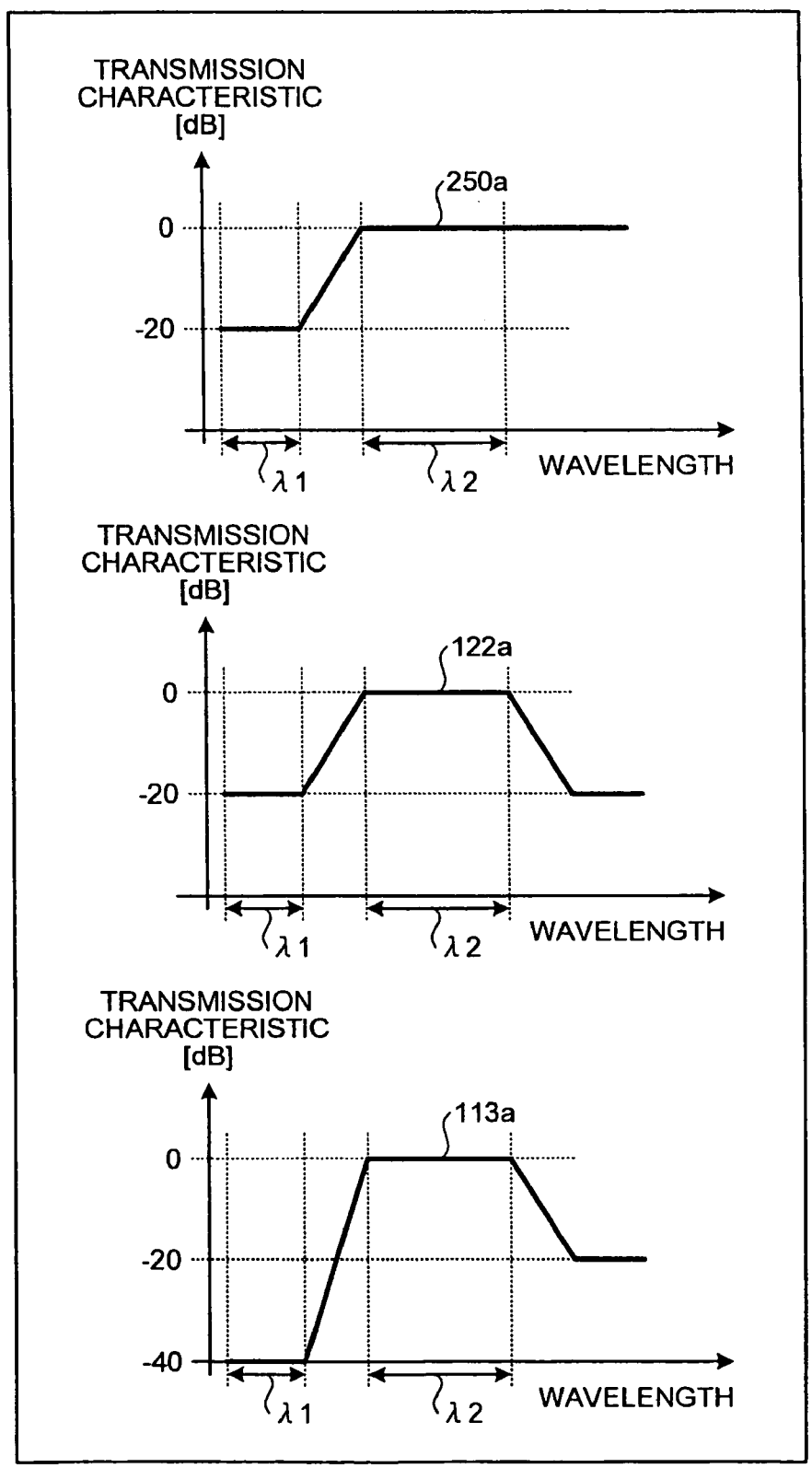
FIG. 9 graphically depicts other examples of wavelength transmission characteristics of the filters.

FIG. 9 graphically depicts other examples of wavelength transmission characteristics of the filters, respectively. In FIG. 9, elements identical to those depicted in FIG. 8 are represented by identical reference numerals, respectively and the explanation thereof is omitted. As represented by the wavelength transmission characteristic 122a in FIG. 9, the filter 122 may be a band filter configured to transmit therethrough wavelength components of the optical signal in the signal band $\lambda 2$ and to attenuate wavelength components of the optical signal at a longer wavelength side of the signal band $\lambda 2$ and wavelength components of the optical signal in and below the supervisory signal band $\lambda 1$.

In this situation, the filter 122 exhibits a transmission characteristic of 0 dB for wavelength components in the signal band $\lambda 2$, and a transmission characteristic of −20 dB for wavelength components of optical signal at the longer wavelength side of the signal band $\lambda 2$ and wavelength components of the optical signal in and below the supervisory signal band $\lambda 1$.

The filter 113 may be configured as a bandpass filter that transmits therethrough wavelength components of optical signal in the signal band $\lambda 2$, and that attenuates wavelength components of the optical signal at a longer wavelength side of the signal band $\lambda 2$ and wavelength components of the optical signal in and below the supervisory signal band $\lambda 1$. The filter 113 exhibits a transmission characteristic of 0 dB for wavelength components in the signal band $\lambda 2$, and a transmission characteristic of −40 dB for wavelength components at the longer wavelength side of the signal band $\lambda 2$ and wavelength components in and below the supervisory signal band $\lambda 1$.

The shapes of the transmission characteristics of the optical filters are mere examples, without limited thereto. As described above, the filter 113 (second optical filter) in the present invention has the wavelength transmission characteristic equivalent to that of the optical filter provided in the path that is passed by the optical signal output to the power controlling apparatus 120 before input into the optical receiving unit 123 (second optical receiving unit) of the power controlling apparatus 120.

Figure 10:
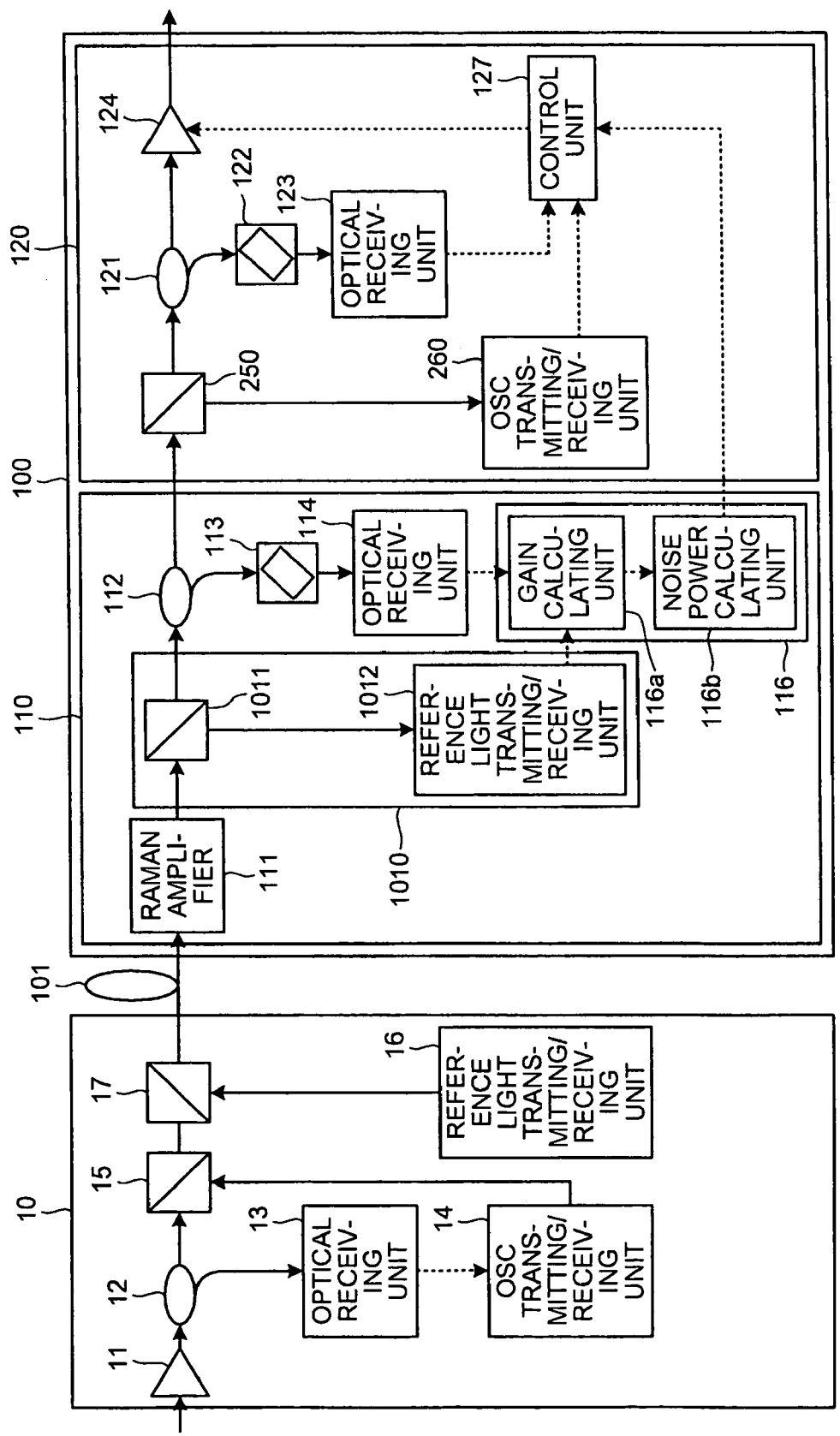
FIG. 10 is a block diagram of a first modified embodiment of the optical communication apparatus depicted in FIG. 2.

FIG. 10 is a block diagram of a first modified embodiment of the optical communication apparatus depicted in FIG. 2. This is an embodiment for realizing constant-gain control, and utilizes a gain reference light (see Japanese Patent Application Laid-Open Publication No. 2004-193640). In FIG. 10, elements identical to those depicted in FIG. 2 are designated by identical reference numerals, respectively and the explanation thereof is omitted. While the optical communication apparatus 100 depicted in FIG. 2 has been explained for a situation where the gain calculating unit 116a calculates the optical signal gain by Raman amplification by the Raman amplifier 111 based on the optical signal power indicated by an electrical signal output from the optical receiving unit 114, and information concerning the input power output from the acquiring unit 115, a situation is described here where gain reference light is transmitted from the optical communication apparatus 10 to the optical communication apparatus 100 in a manner to calculate optical signal gain by utilizing the gain reference light.

The optical communication apparatus 10 includes a reference light transmitting/receiving unit 16 and a multiplexer 17, in addition to the configuration depicted in FIG. 2. The reference light transmitting/receiving unit 16 outputs gain reference light to the multiplexer 17, the gain reference light having a predetermined power at a wavelength different from those of signal components included in optical signal and that of the OSC signal. The multiplexer 17 multiplexes the optical signal output from the multiplexer 15 and the gain reference light output from the reference light transmitting/receiving unit 16, and transmits the multiplexed signals to the optical communication apparatus 100 through the transmission path 101.

The optical amplification apparatus 110 includes a gain reference light acquiring unit 1010 in addition to the configuration depicted in FIG. 2. The gain reference light acquiring unit 1010 includes a demultiplexer 1011 and a reference light transmitting/receiving unit 1012. The demultiplexer 1011 is provided downstream of the Raman amplifier 111. The demultiplexer 1011 transmits optical signal output from the Raman amplifier 111 to the power controlling apparatus 120, and separates the gain reference light included in the light output from the Raman amplifier 111 and outputs the gain reference light to the reference light transmitting/receiving unit 1012.

The reference light transmitting/receiving unit 1012 receives the gain reference light output from the demultiplexer 1011. The reference light transmitting/receiving unit 1012 outputs an electrical signal commensurating with the power of the gain reference light, to the gain calculating unit 116a. The gain calculating unit 116a calculates optical signal gain resulting from Raman amplification by the Raman amplifier 111, by subtracting the optical signal power indicated by the electrical signal output from the reference light transmitting/receiving unit 1012, from a predetermined power upon input transmission of the gain reference light.

Information concerning the predetermined power of the gain reference light upon transmission is transmitted by the optical communication apparatus 10 to the optical communication apparatus 100 by utilizing an OSC signal, and is received by the gain calculating unit 116a through the demultiplexer 250 and the OSC transmitting/receiving unit 260, for example. Alternatively, the information concerning the power of the gain reference light upon transmission may be previously stored in the gain calculating unit 116a.

Figure 11:
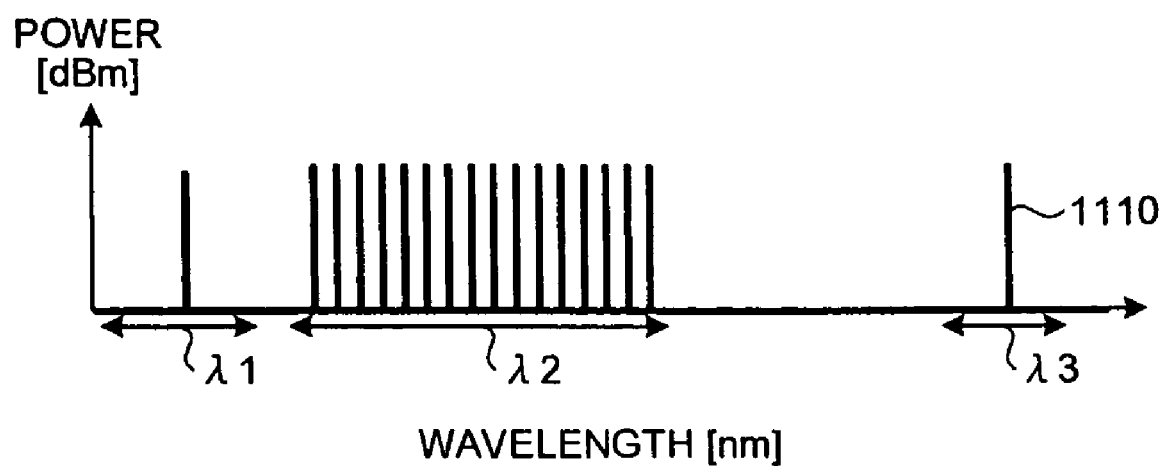
FIG. 11 is a graph of respective components of optical signal and of gain reference light.

FIG. 11 is a graph of respective components of optical signal and of gain reference light. In FIG. 11, elements identical to those depicted in FIG. 7 are represented by identical reference numerals, respectively and the explanation thereof is omitted. As a result of multiplexing, the signal component 710 includes plural signal components, here. Reference numeral 1110 represents gain reference light. Band $\lambda 3$ is a wavelength band for the gain reference light.

Although the wavelength of the gain reference light is not limited, the band $\lambda 3$ is desirably arranged at a longer wavelength side of the supervisory signal band $\lambda 1$ and the signal band $\lambda 2$. This is because, such a longer side is a band exhibiting a smaller gain of Raman amplification such that the effect of noise light due to Raman amplification is low, and it is desirable to select a wavelength band having a transmission path loss equivalent to that of the main signal light band so as to achieve a smaller constant-gain control error, 1600 to 1620 nm recommended therefor.

Figure 12:
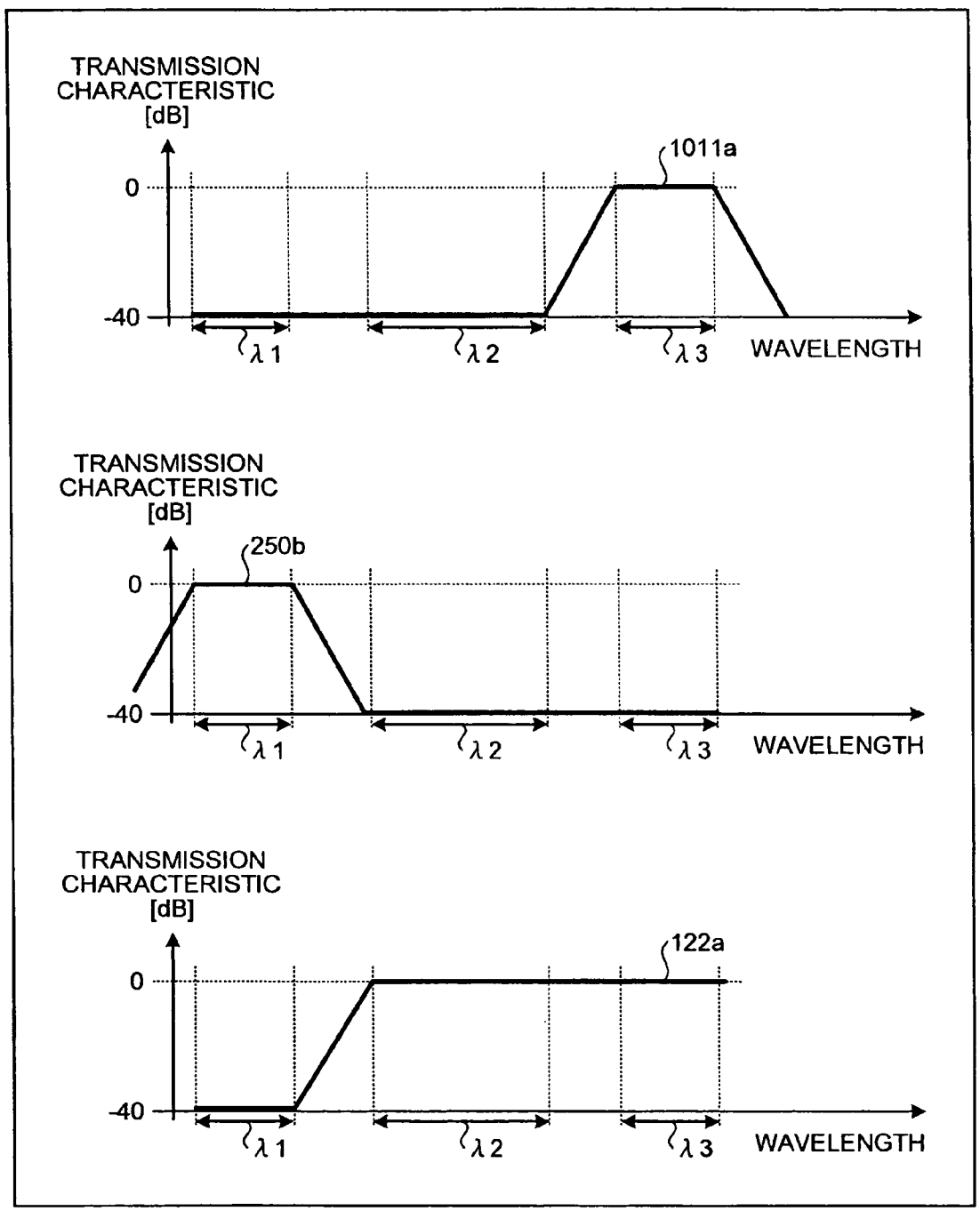
FIG. 12 depicts graphically examples of wavelength transmission characteristics of the filters depicted in FIG. 10.

FIG. 12 depicts graphically examples of wavelength transmission characteristics of the filters depicted in FIG. 10. In FIG. 12, elements identical to those depicted in FIG. 8 are represented by identical reference numerals, respectively and the explanation thereof is omitted. In FIG. 12, reference numeral 1011a represents a wavelength transmission characteristic of the demultiplexer 1011 in the optical amplification apparatus 110, for gain reference light output to the reference light transmitting/receiving unit 1012.

The demultiplexer 1011 outputs the gain reference light included in the light output from the Raman amplifier 111, to the reference light transmitting/receiving unit 1012. Here, the demultiplexer 1011 acts as a bandpass that transmits therethrough a wavelength component in the band $\lambda 3$ and attenuates wavelength components in and below the signal band $\lambda 2$, for light input into the reference light transmitting/receiving unit 1012, as indicated by the wavelength transmission characteristic 1011a. The demultiplexer 1011 exhibits a transmission characteristic of 0 dB for a wavelength component in the band $\lambda 3$, and a transmission characteristic of −40 dB for wavelength components in and below the signal band $\lambda 2$.

The demultiplexer 250 separates the OSC signal from optical signal output to the branching unit 121, and outputs the OSC signal to the OSC transmitting/receiving unit 260. Here, the demultiplexer 250 acts as a low-pass filter configured to attenuate wavelength components in and above the signal band $\lambda 2$ (including band $\lambda 3$) and to transmit therethrough wavelength components in the supervisory signal band $\lambda 1$, for light output to the OSC transmitting/receiving unit 260, as indicated by a wavelength transmission characteristic 250b. The demultiplexer 250 exhibits a transmission characteristic of −40 dB for wavelength components in and above the signal band $\lambda 2$, and a transmission characteristic of 0 dB for a wavelength component in the supervisory signal band $\lambda 1$.

The filter 122 may be a high-pass filter configured to transmit therethrough wavelength components of the passing optical signal in and above the signal band $\lambda 2$ (including band $\lambda 3$) and to attenuate wavelength components of the passing optical signal in and below the supervisory signal band $\lambda 1$. The filter 122 exhibits a transmission characteristic of 0 dB for wavelength components in and above the signal band $\lambda 2$, and a transmission characteristic of −40 dB for wavelength components in and below the supervisory signal band $\lambda 1$.

Figure 13:
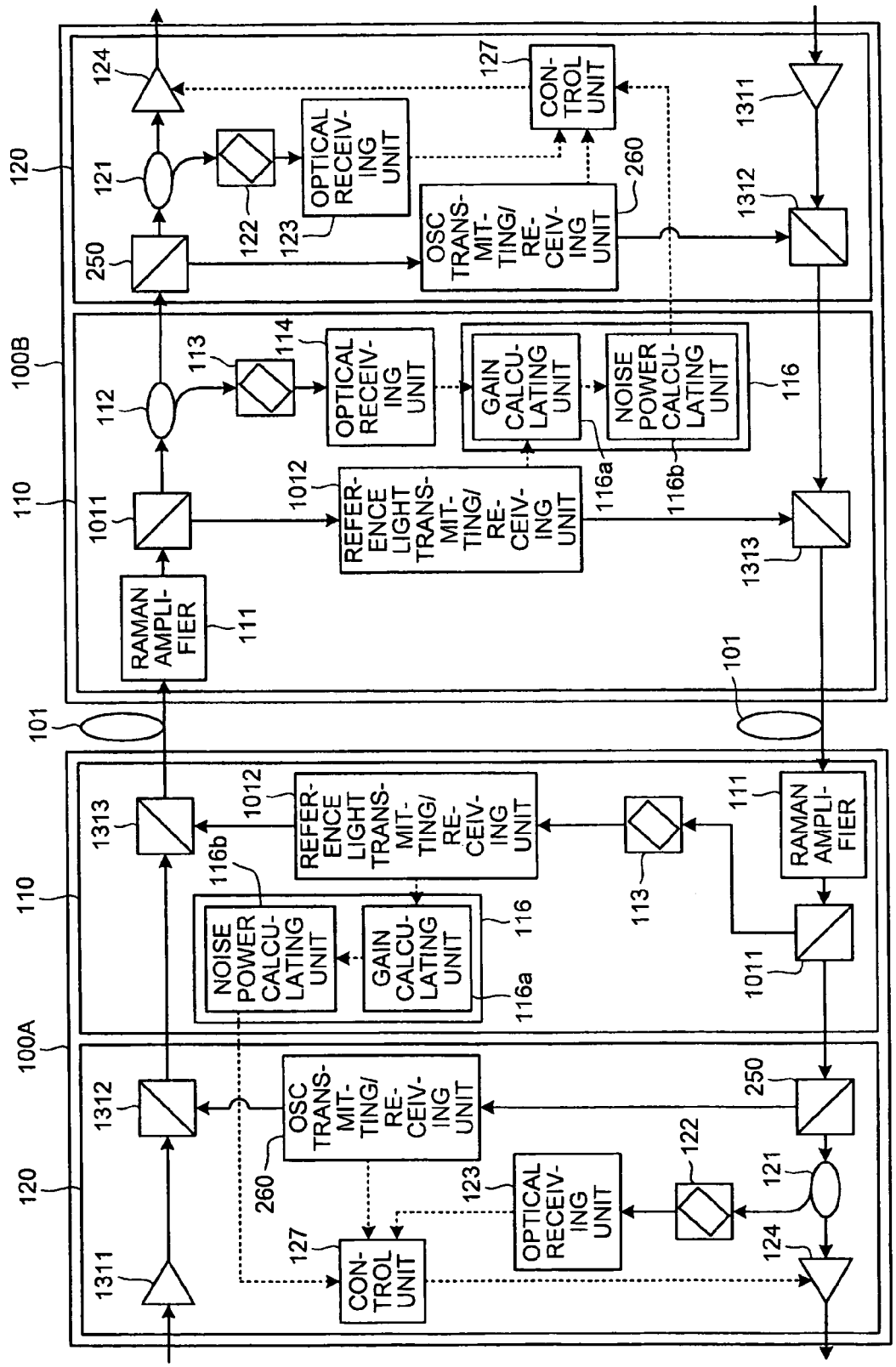
FIG. 13 is a block diagram of a second modified embodiment of the optical communication system depicted in FIG. 2.

FIG. 13 is a block diagram of a second modified embodiment of the optical communication system depicted in FIG. 2. Here, an optical communication system including an optical communication apparatus 100A and an optical communication apparatus 100B that are modified embodiments of the optical communication apparatus 100 depicted in FIG. 2 will be described. The optical communication apparatus 100A is connected to the optical communication apparatus 100B through the transmission path 101. The optical communication apparatus 100A includes an amplifying unit 1311, a multiplexer 1312, and a multiplexer 1313, in addition to the configuration of the optical communication apparatus 100 depicted in FIG. 10.

The amplifying unit 1311 and multiplexer 1312 are provided in the power controlling apparatus 120. The amplifying unit 1311 amplifies the optical signal transmitted from an optical communication apparatus upstream from the optical communication apparatus 110A, and outputs the optical signal to the multiplexer 1312. The OSC transmitting/receiving unit 260 outputs an OSC signal to the multiplexer 1312. The multiplexer 1312 multiplexes the optical signal output from the amplifying unit 1311 with the OSC signal output from the OSC transmitting/receiving unit 260, and outputs the multiplexed optical signal to the optical amplification apparatus 110.

The multiplexer 1313 is provided in the optical amplification apparatus 110. The reference light transmitting/receiving unit 1012 outputs gain reference light to the multiplexer 1313. The multiplexer 1313 multiplexes the optical signal output from the multiplexer 1312 of the power controlling apparatus 120 with the gain reference light output from the reference light transmitting/receiving unit 1012, and transmits the multiplexed light to the optical communication apparatus (optical communication apparatus 100B) downstream from the optical communication apparatus 100.

The optical communication apparatus 100B has an identical configuration with that of the optical communication apparatus 100A. In this way, the optical communication apparatus 100A and optical communication apparatus 100B mutually form a bidirectional optical communication system. Further serial connection thereto of an optical communication system similar to the optical communication apparatus 100A and optical communication apparatus 100B, enables a multi-node, bidirectional optical communication system.

FIG. 14 is a block diagram of a configuration of an optical communication system according to an embodiment. As depicted in FIG. 14, an optical communication system 1400 according to the embodiment is constituted of the optical communication apparatus 100A through optical communication apparatus 100D. The optical communication apparatus 100A and optical communication apparatus 100B have configurations identical to those depicted in FIG. 13, respectively. Also, the optical communication apparatus 100C and optical communication apparatus 100D have configurations identical to those of the optical communication apparatus 100A and optical communication apparatus 100B, respectively.

As a result, noise component power can be calculated with greater accuracy to accurately conduct optical-signal power control, in the optical communication apparatus 100A through optical communication apparatus 100D, respectively (improve of control accuracy). For example, when an optical signal is transmitted from the optical communication apparatus 100A to the optical communication apparatus 100D, the optical signal is transmitted therethrough while power control is performed with increasing accuracy at each of the optical communication apparatus 100A through optical communication apparatus 100D, thereby facilitating a high-quality transmission characteristic.

According to the optical amplification apparatus 110 of this embodiment as described above, the optical receiving unit 114 provided downstream of the Raman amplifier 111 receives a power of optical signal, thereby enabling monitoring of the optical signal power reflecting power fluctuations of noise components such as due to variations in the transmission path 101. By operatively calculating the power of noise components included in the optical signal based on the optical signal power monitored by the optical receiving unit 114, the power of noise components can be calculated with greater accuracy even when the noise components vary in a complicated manner such as due to variations in the transmission path 101.

According to the optical communication apparatus 100 of the embodiment, the power of noise components calculated by the optical amplification apparatus 110 with greater accuracy can be used to perform the power control of the optical signal with greater accuracy. This enables improvement of the transmission characteristic of the optical communication system.

Provided upstream from the optical receiving unit 114 is the filter 113 having a wavelength transmission characteristic equivalent to that of the optical filter provided in a path that is passed by the optical signal output to the power controlling apparatus 120, before the optical signal is input into the optical receiving unit 123 (second optical receiving unit), so that the optical signal equivalent to that to be input into the optical receiving unit 123 can also be input into the optical receiving unit 114. In this way, the power of noise components included in the optical signal monitored at the power controlling apparatus 120 can be calculated at the optical amplification apparatus 110 with greater accuracy.

Although a situation has been explained where the wavelength transmission characteristic of the filter 113 is determined by adopting the optical receiving unit 123 as the second optical receiving unit in the power controlling apparatus 120 depicted in FIG. 1 and FIG. 2, the wavelength transmission characteristic of the filter 113 may be determined by adopting the optical receiving unit 126 as the second optical receiving unit when the control unit 127 controls the amplifying unit 124 based on an electrical signal output from the optical receiving unit 126.

In this situation, the wavelength transmission characteristic of the filter 113 is determined to become equivalent to that of the demultiplexer 250 in the power controlling apparatus 120 depicted in FIG. 2, for example, since the demultiplexer 250 is provided in the path that is passed by the optical signal before the optical signal is input to the optical receiving unit 126 of the power controlling apparatus 120. When the amplifying unit 124 has a wavelength transmission characteristic that is not negligible, the wavelength transmission characteristic of the filter 113 is determined to become equivalent to a combined wavelength transmission characteristic of the amplifying unit 124 and the demultiplexer 250.

Examples of equations for calculation of constant-gain control utilizing gain reference light will be described hereinafter.

$$\text{Gain (dB)} = \text{Span loss (dB)} - (\text{transmission path signal light input power (dBm)} - \text{main signal light power (dBm) at optical receiving unit 114})$$

(Targeted Gain of Main Signal Light is Gx.)

$$\text{Monitored value at optical receiving unit 114 at gain } Gx = \text{ASE power\_}Gx + \text{main signal light power\_}Gx$$

$$\text{ASE power\_}Gx \text{ [mW]} = \text{ASE power [mW] acquired upon startup} \times Gx \text{ [dB]/signal light gain [dB] upon startup}$$

$$\text{Main signal light power\_}Gx \text{ [mW]} = 10x \text{ ((measured value [dBm] of transmission path signal light input power-span loss (dB)} + Gx \text{ [dB])/10)}$$

$$\text{Span loss} = (\text{measured input value of gain reference light into transmission path-output level of gain reference light from transmission path at } Gx + \text{gain of gain reference light at } Gx\text{'')} \times \text{coefficient}$$

(The coefficient is a ratio (fixed value) between transmission path loss in signal band and transmission path loss in gain reference light band.)

$$\text{Output level of gain reference light from transmission path at } Gx = \text{measured output monitor value of gain reference light at } Gx - \text{calculated ASE value in gain reference light band at } Gx$$

$$\text{Calculated ASE value in gain reference light band at } Gx = \text{calculated ASE value in main signal light band at } Gx \times \text{noise light power ratio between gain reference light and signal light band measured at startup}$$

$$\text{Gain of gain reference light at } Gx = Gx \times \text{gain ratio between gain reference light and signal light measured at startup}$$

Although the embodiment has been explained for backward Raman amplification where pump light 111a is input into the transmission path 101 from the optical communication apparatus 100 downstream, forward Raman amplification may be conducted to input pump light into the transmission path 101 from the optical communication apparatus 10 upstream from the transmission path 101. Further, bidirectional Raman amplification may be conducted where both forward Raman amplification and backward Raman amplification are performed.

According to the optical amplification apparatus of the embodiments, the power of the optical signal is monitored by the optical receiving unit provided downstream of the Raman amplifier, thereby enabling monitoring of the power of the optical signal reflecting power fluctuations of the noise component such as due to variations of the transmission path. Output power and gain are derived from identical physical phenomena, and the gain is determined when the output power is determined.

Thus, even when transmission paths loss increases due to some causes, the relationship between the monitored output light power (signal light+noise light) and gain is one-to-one in Raman amplification, thereby achieving effective monitoring in a real-time manner (because the relationship between the output power and the gain is kept constant, even in the presence of transmission path loss variations, pump light power monitoring error, temperature characteristic, aged deterioration, or the like).

Thus, a mechanism is provided that utilizes the optical receiving unit provided at downstream of the Raman amplifier, so as to obtain Raman amplification gain by calculation and thereby, facilitating calculation of noise light power from the gain. This enables calculation of the power of a noise component included in the optical signal with greater accuracy, even when the noise component varies in a complicated manner such as due to variations of the transmission path. Thus, power control of the optical signal can be performed with greater accuracy, by a power controlling apparatus provided downstream.

The present invention is free of limitation of a controlling method for gain or output (main signal light and noise light) of the Raman amplifying apparatus. The method may, for example, preferably to conform to Japanese Patent Application Laid-Open Publication No. 2004-193640.

In enhancing calculation accuracy, a Raman amplifying apparatus and an optical power controlling apparatus provided downstream thereof are adopted. The Raman amplifying apparatus includes a calculating mechanism that utilizes Raman noise light power in each measured band and that subtracts the noise light power caused in Raman amplification from the monitored power (signal light+noise light) so as to correct a monitored receiving level, in a manner to adopt a corrected value free of control error due to noise light power in Raman amplification and to thereby improve accuracy in calculating gain or output.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An optical communication apparatus comprising:
   an optical amplification apparatus including:
      a Raman amplifier that inputs pump light into an optical fiber through which an optical signal passes, to amplify the optical signal;
      a first optical receiving unit provided downstream of the Raman amplifier and configured to monitor power of the optical signal amplified by the Raman amplifier;
      a gain calculating unit that, based on the power monitored by the first optical receiving unit, calculates gain of the optical signal imparted by the pump light;
      a noise-power calculating unit that, based on the gain calculated by the gain calculating unit, calculates power of a noise component included in the optical signal; and
      an output unit that outputs the power of the noise component calculated by the noise-power calculating unit, and
   a power controlling apparatus that is provided downstream of the optical amplification apparatus and includes:
      a second optical receiving unit that monitors the optical signal amplified by the optical amplification apparatus;
      an erbium doped fiber amplifier;
      a third optical receiving unit that monitors the optical signal amplified by the erbium doped fiber amplifier;
      a control unit that controls the erbium doped fiber amplifier,
   wherein
   the control unit calculates gain of a signal component included in the light output from the erbium doped fiber amplifier against the input optical signal, based on power of an optical signal indicated by an electrical signal output from the second optical receiving unit, power of an optical signal indicated by an electrical signal output from the third optical receiving unit, and the power of the noise component.

2. The optical communication apparatus according to claim 1, wherein
   the noise-power calculating unit constantly calculates the power of the noise component during system operation, and
   the output unit, in a real-time manner, outputs to the power controlling apparatus, the power of the noise component.

3. The optical communication apparatus according to claim 1, wherein
   the optical amplification apparatus further comprises a second optical filter that is provided upstream from the first optical receiving unit and that has a wavelength transmission characteristic equivalent to that of a first optical filter provided in a path that the optical signal amplified passes to be input into the second optical receiving unit, and
   the first optical filter has a transmission characteristic to separate a supervisory signal from a main signal included in the optical signal amplified and to extract a signal band component from the optical signal amplified.

4. An optical communication method comprising:
   Raman amplifying an optical signal by inputting pump light of a Raman amplifier into an optical fiber through which the optical signal passes;
   monitoring power of the optical signal amplified at the Raman amplifying, by a first optical receiving unit provided downstream of the Raman amplifier;
   calculating, based on the power monitored at the monitoring, gain of the optical signal imparted by the pump light;
   calculating, based on the gain calculated at the calculating gain, power of a noise component included in the optical signal;
   outputting the power calculated at the calculating the power of a noise component;
   calculating power of a signal component included in the optical signal amplified based on the power of the optical signal amplified and the power of the noise component;
   controlling the power of the optical signal amplified based on the power of the signal component included in the optical signal amplified;
   monitoring the optical signal amplified at the Ramen amplifying by a second optical receiving unit;
   monitoring, by a third optical amplifier, an optical signal amplified by an erbium doped fiber amplifier provided downstream of the Raman amplifier;
   calculating gain of a signal component included in the optical signal of the erbium doped fiber amplifier, based on power of an optical signal monitored by the second optical receiving unit, power of an optical signal monitored by the third optical receiving unit, and the power of the noise component.

* * * * *

UNITED STATES PATENT AND TRADEMARK OFFICE
CERTIFICATE OF CORRECTION

PATENT NO. : 8,049,955 B2
APPLICATION NO. : 12/285229
DATED : November 1, 2011
INVENTOR(S) : Miki Onaka et al.

Page 1 of 1

It is certified that error appears in the above-identified patent and that said Letters Patent is hereby corrected as shown below:

Column 20, Line 52, in Claim 4, delete "Ramen" and insert --Raman--, therefor.

Signed and Sealed this
Twenty-fourth Day of January, 2012

David J. Kappos
*Director of the United States Patent and Trademark Office*